Nov. 10, 1959 H. N. CROOKS ET AL 2,912,493

MAGNETIC SCANNING SYSTEMS

Filed Dec. 15, 1954 4 Sheets-Sheet 1

INVENTORS
HORATIO N. CROOKS AND
ROBERT C. BITTING, JR.
BY
[signature]
ATTORNEY

MAGNETIC SCANNING SYSTEMS

Filed Dec. 15, 1954 4 Sheets-Sheet 2

INVENTORS
HORATO N. CROOKS AND
ROBERT C. BITTING, JR.
BY
[signature]
ATTORNEY

INVENTORS
HORATIO N. CROOKS AND
ROBERT C. BITTING, JR.
BY
ATTORNEY

INVENTORS
HORATIO N. CROOKS AND
ROBERT C. BITTING, JR.
BY
ATTORNEY

United States Patent Office 2,912,493

Patented Nov. 10, 1959

2,912,493

MAGNETIC SCANNING SYSTEMS

Horatio N. Crooks, Haddonfield, and Robert C. Bitting, Jr., Pennsauken, N.J., assignors to Radio Corporation of America, a corporation of Delaware Application December 15, 1954, Serial No. 475,458

10 Claims. (Cl. 178—6.8)

This invention relates to systems for scanning magnetically recorded signals, and in particular to systems for editing television signals which have been recorded on a magnetic tape.

With the advent of video signal magnetic tape recording the problem of editing such tape arises. Unlike motion picture film, where the photographically recorded image is available for direct visual inspection during the editing process, ordinary magnetic tape provides no visible clues by which scene transitions, or the beginnings and ends of programs, etc., may be detected.

According to this invention, a magnetic tape on which information signals such as television signals have been recorded is scanned by means such as a rotating transducer which converts the recorded signals into electrical variations. These variations are displayed by appropriate means such as a kinescope. In one form of the invention, means are provided for presenting a continuous display of signals recorded on portions of the tape which pass the rotating transducer. In another form of the invention, only signals which have been recorded on certain areas of the scanned tape are applied so as to produce an image on the display means. Systems are described both for interlaced and non-interlaced image production.

Regardless of whether the image produced is interlaced or non-interlaced, in at least one form of the invention, the display device is provided with a triggered horizontal sweep arrangement in which each cycle of operation (or horizontal scan) is triggered by an incoming recovered horizontal synchronizing pulse. A conventional vertical deflection circuit for the display device may be synchronized with the rotation of the scanning tape transducer and with the horizontal synchronizing pulses derived therefrom.

It is a primary object of this invention to provide an improved system for examining information signals which have been recorded upon a moveable magnetic medium.

Another object of the invention is to provide a system for inspection of television signals which have been recorded upon a magnetic tape.

A further object of the invention is to provide a system for editing a magnetic tape upon which television signals have been recorded by producing stationary images on a display means regardless of the position or the movement of the tape being scanned.

Other objects of the invention, as well as a more complete understanding thereof will become apparent from reading the following specification and claims, and perusal of the drawings in which:

Figure 1:
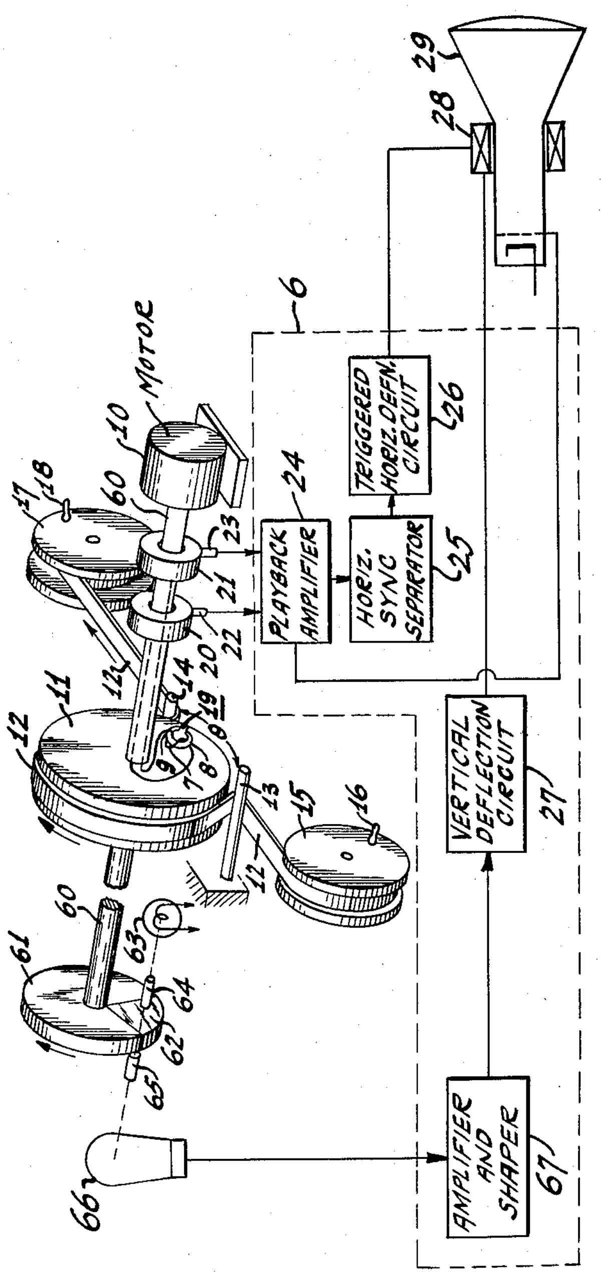
Figure 1 is a schematic and block diagram of one form of the invention.

Referring to Figure 1, a motor 10 drives a drum 11 affixed to a shaft 60 on which a portion of a magnetic tape 12 has been wound. The tape 12 contains recorded television picture and synchronizing information. Guide rollers 13 and 14 keep the tape 12 in close contact with drum 11. The tape 12 is supplied from a supply reel 15 having a handle 16. The tape 12 is passed around the drum 11 and is wound on takeup reel 17 having a handle 18.

Inset close to the curved surface of drum 11 is a magnetic transducer 9. It may consist of a core 8 around which a coil 7 is wound. It has an air gap 19 which runs parallel to the axis of rotation of the drum 11. A pair of slip rings 20 and 21 are mounted fixedly upon the shaft 60, each one being coupled to a corresponding lead of the coil 7. In contact with each of the pair of slip rings is a corresponding one of a set of brushes 22 and 23 respectively.

On the shaft 60 and adapted to rotate therewith is a disc 61 which is opaque except for a section 62. On either side of the disc, optical elements 64 and 65 are located which focus light from light source 63 through the transparent portion 62 onto the photo-sensitive device 66 which may be, for example, a photo-tube.

In practice, the portion of the tape 12 which is wound around drum 11 contains signals corresponding to at least two successive televised fields or one complete frame. The rotation of the drum 11 and the transducer 9 is such that during the time that the transducer 9 passes in contact with the portion of the tape looped around the drum 11, the signals recorded thereupon are converted into electrical variations and applied via brushes 22 and 23 to a playback amplifier 24. If it is desired to apply the recovered signals so as to obtain the recorded images directly, the speed at which the transducer 9 scans the looped tape should be approximately the same as the speed at which the tape originally passed the recording transducer. However, for certain applications there need be no substantial correspondence between the speed of recording and the speed at which the tape is played back.

The playback amplifier 24 may be any of a number of conventional amplifiers which are suitable for the range of frequencies involved. It may contain some equalizing stages to compensate for losses and frequency discrimination which may exist as a result of the characteristics of the transducer 9, the tape 12, etc. One playback amplifier that may be used is illustrated in the copending United States application of W. D. Houghton, Serial No. 362,887, filed June 1, 1953 and entitled "Video Signal Recording Systems." It should be understood, however, that any other suitable video amplifier may alternatively be used.

If the transducer 9 scans a track of the tape 12 on which both picture and synchronizing signals have been recorded a horizontal sync separator circuit 25 may be coupled thereto. The sync separator 25 is adapted to clip the horizontal sync pulses from the composite video signal. The clipped horizontal sync pulses are applied within the sync separator 25 to a differentiating circuit so that the horizontal sync pulses are obtained. The horizontal sync pulses so obtained are then applied to a triggered horizontal deflection circuit 26 which is coupled to deflection yoke 28 associated with kinescope 29. The triggered deflection circuit 26 may be one such as those described in "Basic Television Principles and Servicing" by B. Grob (first edition, McGraw-Hill, 1949) beginning at page 293. By a "triggered" deflection circuit is meant one in which each cycle of operation or scan is triggered by an incoming sync pulse.

The deflection circuit 26 operates to energize the yoke 28 so as to deflect the electron beam of kinescope 29 laterally in keyed response to each of the separated horizontal sync signals. The playback amplifier 24 is also coupled to control the intensity of the electron beam of kinescope 29 as by a connection to a control electrode as shown.

The vertical deflection of the kinescope 29 is obtained in the following manner. When the transparent portion 62 passes between optical elements 64 and 65, the photosensitive device 66 generates a small pulse of current which is applied to an amplifier and shaper 67. By comparing the relative position of the transparent portion 62 and the transducer 9, it may be seen that the portion 62 will cause a pulse to be generated shortly before the transducer 9 begins to scan the looped portion of the tape 12 just above guide roller 13. As a result, the amplified and shaped pulse from shaper 67 will cause a conventional vertical deflection circuit 27 to energize the yoke 28 in such fashion that the electron beam of kinescope 29 begins its downward trace in the upper left hand corner, for example.

It is possible, of course, that the transducer, when it first engages the looped portion above the guide roller 13, will commence scanning picture and horizontal sync signals corresponding to the middle of a field. It is also possible that as the transducer 19 approaches guide roller 14, it will scan only a fragment of the following field recorded upon the tape 12. As a result, the kinescope 29 will contain portions of one or more successive fields depending upon the position of the signals recorded on the portion of tape 12 which is looped around the drum 11. As the operator moves the tape 12 either forward or backward by means of the handles 16 and 18, the picture on the kinescope 29 will change position correspondingly.

It should be noted that this system may be used for television systems or other applications in which the signals of successive fields are not mutually interlaced. This is so because the vertical and horizontal deflection are not precisely related in the required mathematical and temporal relation. In non-standard television systems such as closed-wire television, or in certain military applications, complete non-interlaced frames consisting of approximately 525 lines for example, may be recorded sequentially upon the tape using the system as described above.

Figures 2, 5:
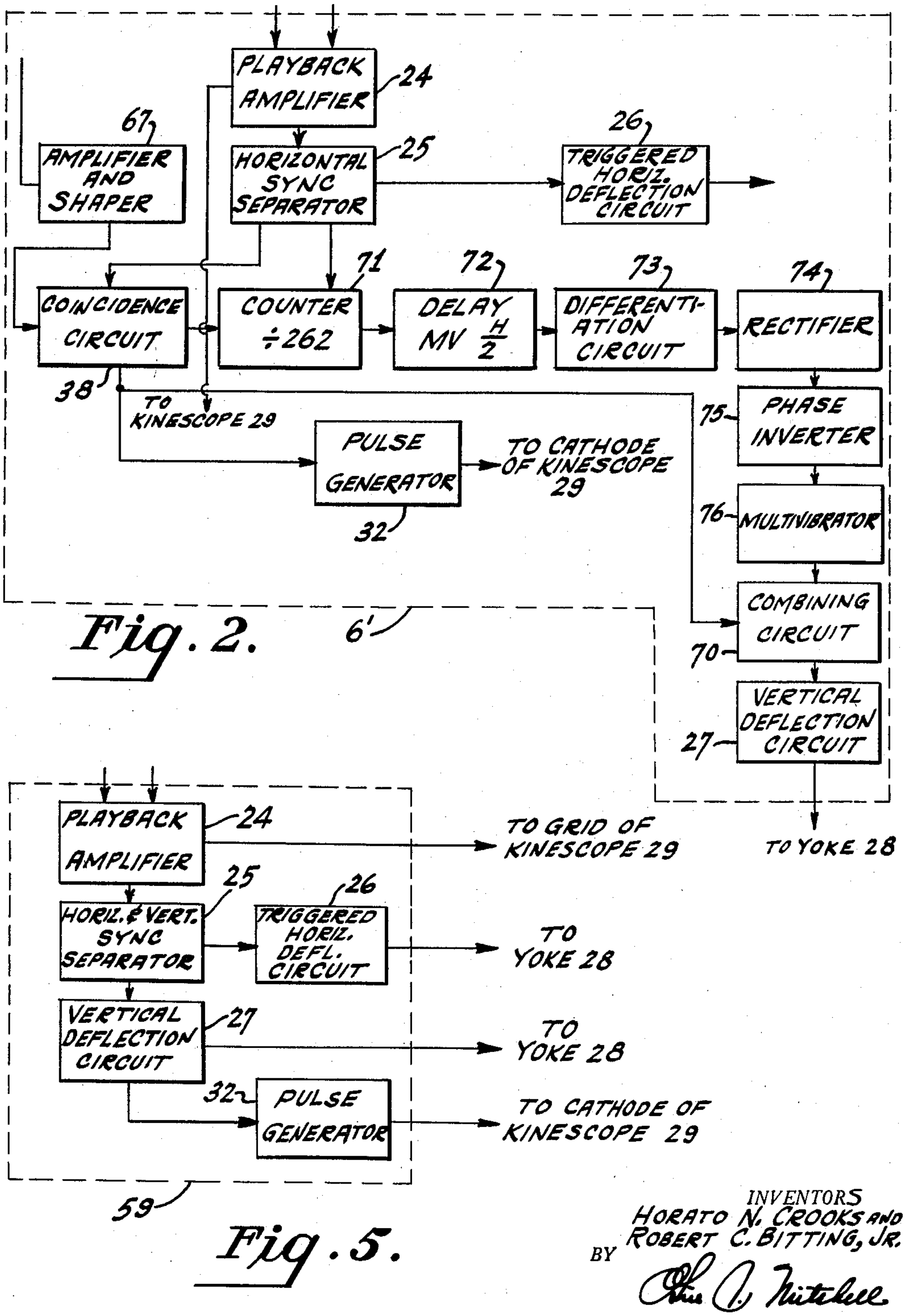
Figure 2 is a block diagram of another form of the invention.
Figure 5 is a block diagram of still another form of the invention.

If a particular application calls for editing tape containing signals corresponding to interlaced recorded fields, the system shown in Figure 2 may be substituted for the one of Figure 1. The components shown within the area 6 of Figure 1 which is bounded by dashed lines may be supplanted by those shown in the dashed line area 6' of Figure 2. Parts in Figure 2 corresponding to those in Figure 1 are similarly numbered and need not be explained further. In Figure 2, the playback amplifier 24 is coupled to kinescope 29 and to a horizontal sync separator 25 in a manner similar to that explained in connection with Figure 1. The sync separator 25 removes the horizontal sync pulses from the composite video signals and applies a portion of them to a triggered horizontal deflection circuit 26 as in Figure 1. Similarly the amplifier 67 produces a shaped pulse each time the transparent section 62 of the rotating disc 61 is in the optical path between optical elements 64 and 65. Thus, as the transducer 9 starts to scan the portion of the tape 12 just above the guide roller 13, an amplified and shaped pulse from shaper 67 which is used as the first vertical sync pulse is applied to one input of a coincidence circuit 38. This pulse should be at least as long as the horizontal sweep time so that at least one horizontal sync pulse will be scanned during the duration of the vertical sync pulse. Almost simultaneously the transducer 9 will begin to scan horizontal sync signals. Horizontal sync signals from separator 25 are also applied to the coincidence circuit 38. The coincidence circuit 38 will produce a pulse which is applied to a combining circuit 70. This coincidence pulse is also applied to reset a counter 71.

Another portion of the separated horizontal sync pulse output of sync separator 25 is applied to a counter 71. When 262 pulses at the horizontal synchronizing rate have been applied to counter 71 (which has been reset by the coincidence pulse), it produces an output pulse which triggers a delay multivibrator 72. The delay multivibrator 72 stays on for a period corresponding to the time required to scan ½ of a line of a reproduced image. A differentiating circuit 73 causes positive and negative "spikes" or pulses to be formed in response to the leading and trailing edges respectively of the output pulses of delay multivibrator 72. A rectifier 74 coupled to differentiating circuit 73 selects the negative spikes corresponding to the trailing edges which occur at a time corresponding to approximately one-half line later than the positive spikes. In turn, the selected spikes are inverted in polarity by a phase inverter 75. Phase inverter 75 is so coupled that the positive spikes it produces trigger the multivibrator 76. Multivibrator 76 thereupon produces a pulse which is applied via the combining circuit 70 to the vertical deflection circuit 27.

Thus the kinescope 29 will start to be deflected when the coincidence circuit 38 produces a pulse which is applied to combining circuit 70 as the transducer 9 begins to scan the looped tape 12. The counter 71 begins to count horizontal sync pulses as soon as the coincidence pulse is produced. In cooperation with the delay multivibrator 72 and its associated circuit, another pulse will be applied via combining circuit 70 to vertical deflection circuit 27 one field later and displaced by one-half of a line to insure interlace. The vertical deflection circuit 27 will next be actuated by another coincidence pulse from coincidence circuit 38 via combining circuit 70 when the transparent portion 62 of the disc again passes in the optical path of the light source 63 at the beginning of the next cycle of rotation.

To insure that the kinescope 29 is not deflected vertically again after it has been actuated by the coincidence pulse and the pulse from multivibrator 76, the negative coincidence pulse is also applied to trigger a pulse generator 32 such as a multivibrator. The pulse generator 32 produces negative pulses having a duration of two successive fields or one frame which is applied to unblank the kinescope 29. In such fashion, even though the counter 71 produces another output pulse 524 lines after it has begun counting it will not affect the image appearing on the kinescope 29.

Since the delay multivibrator 72 produces a negative pulse in response to the pulse from counter 71, the differentiating circuit 73 will produce negative and positive spikes corresponding to the leading and trailing edges thereof. If the differentiating circuit 73 is coupled directly to multivibrator 76 and the rectifier 74 and the phase inverter 75 are omitted, the multivibrator 76 will ignore the negative spikes by being triggered solely by the positive spikes assuming proper biasing of the multivibrator 76. In such a form of the invention, the picture on the display means will move up or down as the tape 12 is moved forward or backward around the drum 11.

Figures 3, 4:
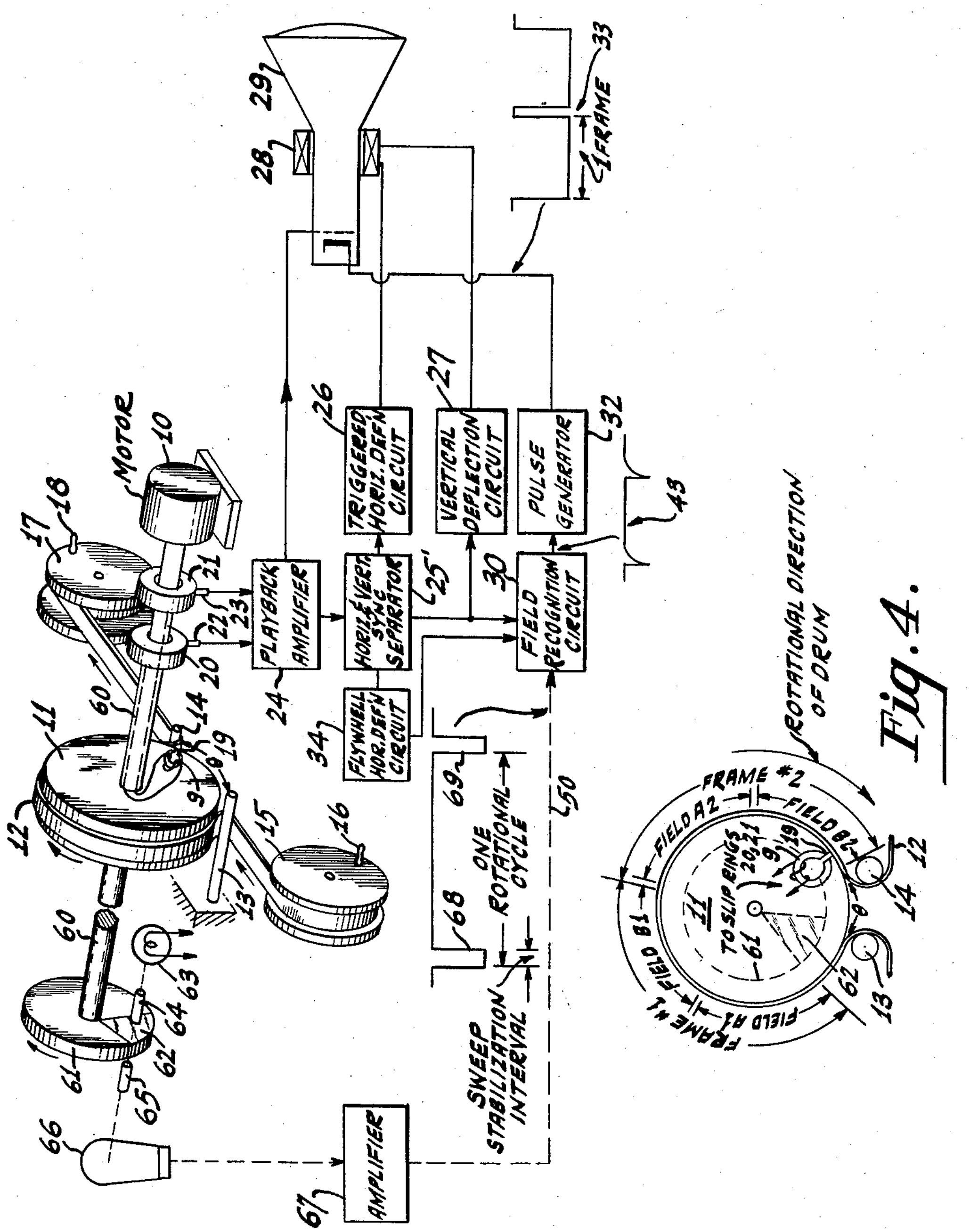
Figure 3 is a block and schematic diagram of still another form of the invention.
Figure 4 shows the disposition of the tape in the form of the invention depicted in Figure 3.

In Figure 3 still another form of the invention is shown wherein it is possible to have a visual presentation on the display means 29 which is always properly framed and contains one complete picture. As indicated in the previous figures of the drawing, the tape 12 is wound around the rotating drum 11 and the transducer 9 is adapted to scan portions of the tape with which it makes contact. Recovered signals are applied via brushes 22 and 23 to playback amplifier 24 which accomplishes the necessary amplification and equalization. Amplifier 24 is coupled to the grid of kinescope 29 to control the intensity of the electron beam therein. Amplifier 24 is also coupled to a horizontal and vertical sync separator 25' which operates to separate both horizontal and vertical sync pulses from the recovered signals by conventional means. One such typical sync separating circuit is illustrated in "Basic Television Principles and Servicing" by B. Grob at page 284 (First edition, McGraw-Hill, 1949). Not only does it contain a differentiating circuit to separate horizontal sync, but it also contains an integrating circuit to separate the vertical sync pulses.

A portion of the separated horizontal sync signals is applied to a triggered horizontal deflection circuit 26 which is similar to that of Figure 1. Deflection circuit 26 is coupled to yoke 28 associated with kinescope 29.

Another portion of the separated horizontal sync is applied to a so-called AFC or "flywheel" type of horizontal deflection circuit 34. This type of horizontal deflection circuit is common in many modern commercially available television receivers. Instead of having an oscillator which produces a deflection wave only when triggered by an incoming sync pulse, or having a free running oscillator each of whose cycles of oscillation is synchronized by a corresponding sync pulse, a frequency controlled oscillator is employed. A number of incoming sync pulses are compared with a standard frequency. An automatic frequency control system is used which adjusts the frequency of the controlled horizontal oscillator in response to an error voltage produced when the frequency of the incoming pulses and the standard frequency depart from a predetermined mutual relation. This type of deflection circuit is very stable, comparatively noise immune, and produces accurate deflection voltages.

The output waves of the flywheel deflection circuit 34 are applied to one input of a field recognition circuit 30. To the field recognition circuit 30, vertical sync pulses from the sync separator 25' are also applied. It is characteristic of the standard United States television broadcast wave form that the vertical and horizontal sync pulses coincide in odd numbered fields (hereinafter termed "A" fields) as distinguished from even numbered fields (hereinafter termed "B" fields). The field recognition circuit 30, therefore, will produce a set of negative pulses 43 having a repetition rate of 30 c.p.s. In response to each of the pulses 43, the generator 32 will produce negative rectangular pulses 33 which are applied to the cathode of kinescope 29. Each of the pulses 33 has a duration of approximately one frame so that the kinescope 29 is operative only during time intervals of $\frac{1}{30}$ of a second.

Figure 4 shows schematically the number and disposition of fields that should be wound around the drum 11 to permit the system of Figure 3 to operate effectively. It is seen that at least four complete consecutive fields numbered A1, B1, A2, and B2 respectively should be on the tape 12 to insure that at least one complete frame consisting of two consecutive fields is scanned in any one cycle of rotation of the drum 11. A portion 62 of the disc 61 has been sketched in to show its relation to the position of the transducer 9.

To improve the operation of the apparatus of Figure 3 as described so far the disc 61 may be used to provide a signal which inhibits the kinescope 29 from being unblanked until the transducer 9 has had an opportunity to recover a number of horizontal sync pulses. This inhibiting circuit is used for the following reason:

The pulses 43 produced by the field recognition circuit 30 will be more accurate if the horizontal pulses from the flywheel deflection circuit 34 have the proper frequency and phase. Since the characteristics of the flywheel deflection circuit 34 are such that it averages out the frequency of a number of incoming sync pulses, the transducer 9 should be given an opportunity to provide a representative number of these pulses. Therefore, the disc 61 having the transparent portion 62 and the accompanying optical elements 64 and 65 are used to cause the photo-tube 66 to generate an inhibiting pulse in response to light from light source 63 when the transducer 9 begins to make contact with the portion of the tape 12 just above guide roller 13. This inhibiting pulse is amplified by amplifier and shaper 67, and applied through the optional lead 50 (shown in dashed lines) to field recognition circuit 30. Pulses 68 and 69 at the input to field recognition circuit 30 are negatively polarized so that circuit 30 is prevented from producing pulses 43 while pulses 68 and 69 are applied. During this interval the transducer 9 is recovering horizontal sinc signals which are separated by sync separator 25' and used to permit the flywheel deflection circuit 34 to stabilize at the proper frequency thus providing properly timed pulses at the horizontal sync pulse repetition rate to field recognition circuit 30. When the transducer 9 has passed the portion of the tape 12 just above guide roller 13, the field recognition circuit 30 may be permitted to operate to detect the coincidence of horizontal and vertical sync pulses and thereby the beginnings of "A" fields. The gate pulse generator 32 then unblanks the kinescope 29 for one frame by means of pulses 33 as explained previously.

Figure 6:
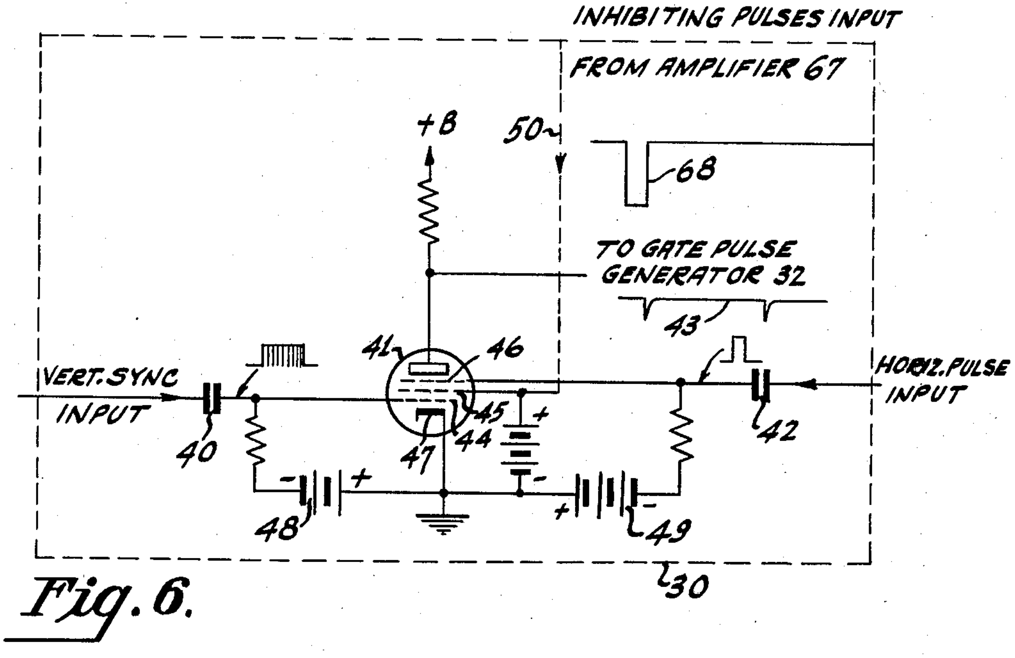
Figure 6 is a circuit diagram corresponding to one of the elements of the form of the invention shown in Figure 3.

Figure 6 is a circuit diagram of the field recognition circuit 30 of Figure 3. A tube 41 such as a 6AS6, for example, or its equivalent is shown to whose control, screen, and suppressor grids three different sets of signals may be applied. It is characteristic of this tube that no plate current will flow, and no signal will appear in its output unless the signals on control grid 44, screen grid 45, and suppressor grid 46 are more positive than a prescribed set of voltages. Vertical synchronizing pulses from sync separator 25 are applied via condenser 40 to control grid 44. A bias source 48 controls the D.-C. potential on the control grid 44. Pulses having the correct horizontal repetition rate are applied from the flywheel horizontal deflection circuit 34 through condenser 42 to the suppressor grid 46. A bias source 49 furnishes the requisite screen D.-C. potential. When the signals applied to the control grid 44 and the suppressor grid 46 are both positive, pulses 43 will appear at the plate of tube 41 which are eventually inverted in polarity and applied to key a pulse generator 32 as has been explained above.

The inhibiting pulses 68 and 69 are applied from amplifier 67 by way of lead 50 to the screen grid 45. While this negative voltage is on the screen 45, the tube 41 will produce no output pulses, thus preventing the kinescope 29 from being unblanked by pulses from pulse generator 32 and allowing the horizontal flywheel deflection circuit 34 to achieve stability.

In accordance with one form of the invention the device may be operated without employing the inhibiting pulse generator.

Figure 7:
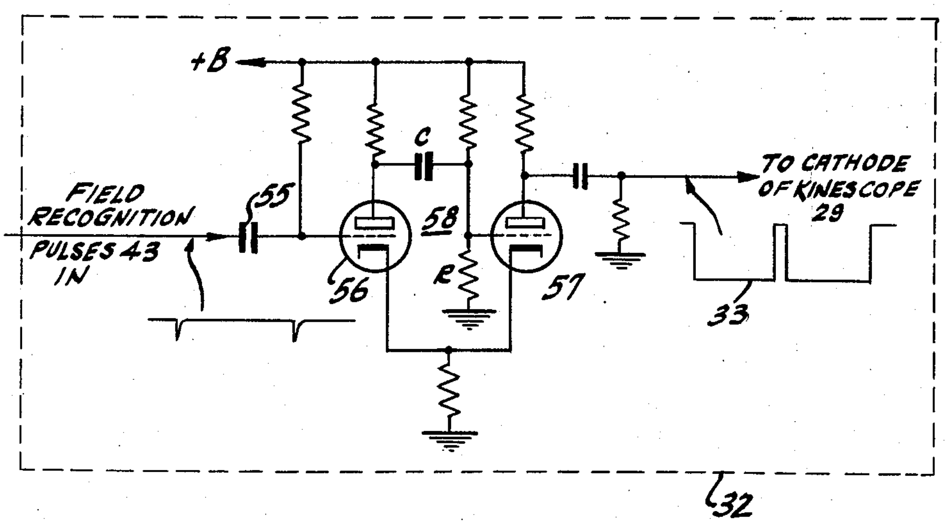
Figure 7 is a circuit diagram of another component of the form of the invention shown in Figure 3.

Figure 7 shows one possible circuit that may be used as the pulse generator 32 of Figure 3. Whenever the field recognition circuit 30 produces negative pulses 43 they are applied through condenser 55 to the control grid of a triode 56 which, together with another triode, constitutes a cathode-coupled multivibrator 58. In response to each of the applied pulses 43, the multivibrator 58 produces negative output pulses 33 each having a duration of one frame. By the proper choice of values for condenser C and resistor R the requisite pulse duration may be obtained. The negative pulses 33 are then applied to the kinescope cathode to unblank the kinescope 29.

Figure 5 shows another form of the invention which operates such that, despite the position of the tape 12 upon the drum 11, a complete and stationary image is always produced by the kinescope 29. Within the dashed line box 59 are shown parts which may be substituted for those in dashed line box 6 of Figure 1. In this form of the invention the disc 61 and its associated components are not used. The signals recovered by transducer 9 are applied via slip rings 20 and 21, and brushes 22 and 23 to playback amplifier 24. One portion of the output voltage wave of amplifier 24 is applied to control the intensity of cathode-ray kinescope 29. Another portion of the output voltage wave of amplifier 24 is applied to a sync separator 25.

Horizontal and vertical sync are separated from the composite video wave by means of a conventional horizontal and vertical sync separator 25' which has previously been described in connection with Figure 3. The separated horizontal sync is applied to control triggered horizontal deflection circuit 26 which is coupled to yoke 28. The separated vertical sync pulses are applied to a vertical deflection circuit 27 which is also coupled to yoke 28. The vertical deflection circuit 27 also supplies a portion of its output waves to a pulse generator 32 which may be similar to the one shown in Figure 3. It produces negative rectangular pulses of frame duration such as pulses 33 (Figure 3) which are applied to the cathode of kinescope 29 thus rendering the latter operative. Thus, no pictures will be presented by the kinescope 29 until it is unblanked by pulses from generator 32. Generator 32 is not operative until the first vertical sync pulse separated by sync separator 25 activates the vertical deflection circuit 27. The next detected vertical sync pulse will similarly activate vertical deflection circuit 27 causing the cathode-ray of kinescope 29 to begin scanning of the next field. Since the original relation of the horizontal and vertical sync pulses is maintained, interlace will be preserved. No matter what the position of the signals recorded on the looped tape 12 is, a complete interlaced and framed picture will always be presented on the kinescope 29. Even if the operator is moving the tape, a picture corresponding to two complete successive fields will be visible.

The invention has been described in its various forms on the assumption that the synchronizing signals appear in the same track as the picture signals. It should be understood, however, that if the synchronizing signals are placed on a separate track or tracks, the invention is essentially the same except that separate transducers will be required to recover the synchronizing signals and the picture signals. These transducers will be electrically independent and will be coupled to their respective playback amplifiers by means of independent slip ring-brush sets which may also be positioned on the shaft 60. Furthermore, in this event, there is no necessity for clipping sections in the sync separator associated with the synchronizing signal track. All that will be needed will be means for separating horizontal from vertical sync signals, i.e. differentiating and integrating circuits. These are not required if separate tracks are used for horizontal and vertical sync signals respectively.

If color television signals are recorded such as has been described in an article appearing in the RCA Review for March 1954, beginning at page 3 a number of playback amplifiers for each of the color components should be used. These playback amplifiers will feed an appropriate color television display apparatus. There will also be a playback amplifier and means for separating horizontal from vertical sync pulses associated with the synchronizing signal track.

Having thus described the invention, what is claimed is:

1. In an apparatus for use in editing a recording medium which is in tape form and which bears recorded representations of television signals having a synchronizing component and a picture brightness variation component, the combination of: a mechanical reference datum to which all structure and motion hereinafter defined may be mechanically referenced; means for holding a tape to be edited in a stationary condition with respect to said datum; tape transducing means including a tape playback means for transducing recorded representations on a tape of the type described into corresponding electrical signals when said playback means is in moving, scanning juxtaposition with tape held by said holding means; rotatable means holding said playback means for moving said playback means in scanning relation to a fixed length of tape held stationary with respect to said datum by said holding means; means driving said rotatable means at a substantially constant rotational speed to cause said playback means to recurrently scan a fixed length of said tape to produce electrical signals representing the information recorded on said fixed length of tape, said electrical signals including said synchronizing component, and said picture brightness variation component; a cathode ray beam signal display device for producing a visible display of electrical signals, said display device employing an electron beam whose intensity may be modulated to produce brightness variations in said visible display and also employing means for simultaneously deflecting said beam in vertical and horizontal directions to produce a display raster, said deflections being subject to synchronization by applied synchronizing pulses; means coupled with said transducing means and said display means for modulating said beam intensity with picture brightness variation component signals reproduced from tape scanned by said playback means; means coupled to said playback means for producing cyclical pulses at least once per cycle of rotation of said playback means, and means coupled with said deflection means for timing at least one of said beam deflections with the simultaneous occurrence of said cyclical pulses and said synchronizing component.

2. A system for editing magnetic tape on which television signals including picture signals and horizontal synchronizing pulses have been recorded, said system comprising in combination rotary scanning means positioned to pass substantially into contact with predetermined portions of said tape, said scanning means including transducing means for recovering said recorded picture and horizontal synchronizing pulses, means including having deflection means and light intensity control means for visibly displaying said recovered picture signals, means for applying said recovered picture signals to said display intensity control means, means coupled to said scanning means for producing pulses at least once per cycle of rotation of said scanning means; means coupled to said pulse producing means, to said scanning means, and to said deflection means for initiating the vertical deflection of said display means whenever said pulses and said horizontal synchronizing signals coincide; means coupled to said scanning means and to said deflection means for initiating the vertical deflection of said display means a measured time after said vertical deflection is initiated upon the coincidence of said pulses and said horizontal synchronizing signals whereby said display means produces interlaced images; and means coupled to said transducing means for controlling the horizontal deflection of said display means in response to said recovered horizontal synchronizing signals.

3. A system for editing magnetic tape on which television signals including picture signals and horizontal synchronizing pulses have been recorded, said system comprising in combination rotary scanning means positioned to pass substantially into contact with predetermined portions of said tape, said scanning means including transducing means for converting said recorded picture and synchronizing pulses into corresponding electrical variations, means for amplifying said electrical variations, means including deflection means and light intensity control means for visibly displaying said electrical variations means for applying the variations corresponding to said amplified horizontal synchronizing pulses to control the horizontal deflection of said display means, means coupled to said scanning means for producing control pulses at least once per cycle of rotation of said scanning means, a coincidence circuit having two input circuits, means for applying said amplified horizontal synchronizing pulses to one of said input circuits, means for applying said control pulses to the other of said input circuits, said coincidence circuit thereupon being adapted to produce coincidence pulses whenever said applied pulses coincide, means for applying said coincidence pulses to said deflection means for initiating the vertical deflection of said display means, counter means, said counter means being adapted to receive said coincidence pulses and said amplified horizontal synchronizing pulses, said counter means being adapted to produce output pulses in response to a predetermined number of amplified horizontal synchronizing pulses following each of said coincidence pulses, means for delaying said output pulses by a period of time substantially equal to one-half the interval between successive horizontal synchronizing pulses, means coupled to said delay means and to said deflection means for initiating the vertical deflection of said display means in response to said delayed output pulses, said deflection means thereby causing interlace images to be produced by said display means.

4. A system for editing magnetic tape on which television signals including picture signals and horizontal and vertical synchronizing signals have been recorded, comprising in combination rotary scanning means adapted to pass substantially into contact with predetermined portions of said tape, said scanning means being adapted to convert said recorded picture and synchronizing signals into corresponding electrical variations, means for amplifying said recovered picture and synchronizing signals, means coupled to said amplifying means for separating said horizontal and vertical synchronizing signals, display means having deflection means associated therewith, means coupled to said amplifying means for applying said amplified picture signals to said display means, means coupled to said separating means and to said deflection means for controlling the horizontal deflection of said display means substantially in response to each of said separated horizontal synchronizing signals, means coupled to said separating means and to said deflection means for controlling the vertical deflection of said display means in response to said separated vertical synchronizing signals, a flywheel type of horizontal deflection circuit coupled to said separating means, said flywheel circuit producing pulses at the nominal horizontal deflection frequency in response to a number of said separated horizontal synchronizing signals, a coincidence circuit having at least two input circuits, means for applying said flywheel pulses to one of said input circuits, means for applying said separated synchronizing signals to the other of said input circuits, said coincidence circuit being adapted to produce coincidence pulses when said input signals coincide, and means coupled to said coincidence circuit and to said display means for permitting said display means to produce images only during certain predetermined time intervals in response to said coincidence pulses.

5. The invention according to claim 4 wherein said coincidence circuit has a third input circuit and wherein means coupled to said scanning means produces inhibiting pulses, said inhibiting pulses being adapted to prevent said coincidence circuit from producing coincidence pulses for a short interval after said scanning means begins to recover said recorded signals on each cycle of its rotation.

6. A system for editing magnetic tape on which television signals including picture signals and horizontal and vertical synchronizing pulses have been recorded, said system comprising in combination rotary scanning means adapted to pass substantially into contact with predetermined portions of said tape, said scanning means being adapted to convert said recorded signals and pulses into corresponding electrical variations, means for amplifying said electrical variations, display means having deflection means associated therewith, means for applying said amplified variations corresponding to said recorded picture signals to said display means, means coupled to said amplifying means for separating said variations corresponding to said horizontal and vertical synchronizing pulses, means coupled to said separating means and to deflection means for controlling the horizontal deflection of said display means substantially in response to each of said separated variations corresponding to said horizontal synchronizing pulses, means coupled to said scanning means for producing cyclical pulses at least once per rotation of said scanning means, means coupled to said separating means and to said deflection means for controlling the vertical deflection of said display means in response to said separated variations corresponding to said vertical synchronizing pulses, and means coupled to said last-named means, to said pulse producing means, and to said display means for permitting said display means to produce images only during predetermined intervals.

7. In an apparatus for use in editing a recording medium which is in tape form and which bears recorded representations of television signals having a picture component and a synchronizing component, the combination of: a mechanical reference datum to which all structure and motion hereinafter defined may be mechanically referenced; means for holding a tape to be edited in a stationary condition with respect to said datum; tape transducing means including a tape playback means for transducing recorded representations on a tape of the type described into corresponding electrical signals when said playback means is in moving, scanning juxtaposition with tape held by said holding means; rotatable means holding said playback means for moving said playback means in scanning relation to a fixed length of the tape held stationary with respect to said datum by said holding means; means driving said rotatable means at a substantially constant rotational speed to cause said playback means to recurrently scan a fixed length of said tape to produce electrical signals representing the information recorded on said fixed length of tape, said electrical signals including said synchronizing component and said picture component; means independent of the recorded representations on the tape and coupled with said driving means for producing recurrent pulses corresponding in timing to the rotation of said rotatable means; television image display means for transducing a picture component signal into a visible image, said display means requiring the application of vertical and horizontal television deflection signals; vertical television deflection signal generating means operatively coupled with said display means, with said transducing means, and with said recurrent pulse producing means, said generating means being responsive to the simultaneous occurrence of said recurrent pulses and said reproduced synchronizing component to produce vertical deflection in said display means which is timed in accordance with the rotation of said rotatable means; and horizontal television deflection signals generating means operatively coupled with said display means and said transducing means, said horizontal deflection signal generating means being responsive to reproduced television signal synchronizing components to produce horizontal deflection in said display means which is timed in accordance with recorded television signal synchronizing component.

8. A system for editing magnetic tape on which television signals, including picture signals and horizontal synchronizing pulses, have been recorded, said system comprising in combination, means to successively transduce said recorded television signals from predetermined portions of said tape into successive electrical signals, means coupled to said transducing means to separate said horizontal synchronizing pulses from said electrical signals, display means having a light intensity control and deflection means, means mechanically coupled to said transducing means for providing successive pulses indicative of the occurrence of said successive electrical signals, and means coupled to said separating means, to said pulse providing means, and to said transducing means for driving said deflection means and said light intensity control means to produce a display of the picture represented by said picture signals.

9. A system for editing magnetic tape on which television signals, including picture signals and horizontal synchronizing pulses, have been recorded, said system comprising in combination, means to repetitively recover said recorded television signal from predetermined portions of said tape into repetitive electrical signals, means coupled to said recovering means to separate said horizontal synchronizing pulses from said electrical signals, display means having a light intensity control and deflection means, means mechanically coupled to said recovering means for providing successive pulses indicative of the occurrence of said successive electrical signals, and means coupled to said separating means, to said pulse providing means, and to said recovering means for driving said deflection means and said light intensity control means to produce a display of the picture represented by said picture signals.

10. A system for editing magnetic tape on which television signals, including picture signals and horizontal synchronizing pulses, have been recorded, said system comprising in combination, means to successively transduce said recorded television signals from predetermined portions of said tape into successive electrical signals, said transducing means having means associated therewith for providing repetitive reference signals, means coupled to said transducing means to separate said horizontal synchronizing pulses from said electrical signals, display means having a light intensity control and deflection means, triggered horizontal deflection means coupled to said separating means for driving said display deflection means, said display means intensity control being coupled to said transducing means, said display means including vertical deflection means, and means coupled to said reference signal providing means and to said separating means for driving said vertical deflection means upon the simultaneous occurrence of said horizontal synchronizing pulses and said reference signals.

References Cited in the file of this patent

UNITED STATES PATENTS

| | | |
|---|---|---|
| 1,867,542 | Hammond | July 19, 1932 |
| 2,528,699 | Masterson | Nov. 7, 1950 |
| 2,816,157 | Andreas | Dec. 10, 1957 |
| 2,832,840 | Morin | Apr. 29, 1958 |

OTHER REFERENCES

RCA, TN No. 20, August 9, 1957.

Russian patent abstract, 112,255, July 8, 1932.